United States Patent [19]

Yoshida et al.

[11] 3,906,046

[45] Sept. 16, 1975

[54] PROCESS FOR THE PRODUCTION OF 2-AMINO-1-BUTANOL

[75] Inventors: Hiroshi Yoshida, Fujisawa; Kazuyoshi Sasai, Tokyo; Teruo Kubomatsu, Osaka, all of Japan

[73] Assignee: Nippon Soda Company, Limited, Tokyo, Japan

[22] Filed: Jan. 2, 1974

[21] Appl. No.: 430,042

[52] U.S. Cl............. 260/584 R; 252/467; 252/476
[51] Int. Cl.² ................. C07C 91/02; C07C 93/02; C07C 93/10; C07C 95/02
[58] Field of Search ............................. 260/584 R

[56] References Cited
UNITED STATES PATENTS

| | | | |
|---|---|---|---|
| 2,823,236 | 2/1958 | Lowe et al. | 260/584 R |
| 3,317,505 | 5/1967 | Braus | 260/584 R X |

*Primary Examiner*—Paul F. Shaver
*Attorney, Agent, or Firm*—George B. Oujevolk

[57] ABSTRACT

Copper chromite-catalyzed reaction, wherein an ester of α-aminobutyric acid is reduced with hydrogen in an organic solvent to yield 2-amino-1-butanol. The objective is achieved by carrying out the reaction in the presence of a copper chromite catalyst which has received a preliminary treatment.

9 Claims, No Drawings

PROCESS FOR THE PRODUCTION OF 2-AMINO-1-BUTANOL

BACKGROUND OF THE INVENTION

The present invention relates to the production of 2-amino-1-butanol which is useful as an intermediate of medicines or as an addition agent to toilet goods and more particularly concerns the production of the same by reducing an ester of α-aminobutyric acid with hydrogen in the presence of a copper chromite catalyst having received a preliminary treatment with hydrogen.

Two methods for producing 2-amino-1-butanol have heretofore been well-known.

One is a method wherein 2-nitrobutanol is produced by the reaction of 1-nitropropane with formaldehyde and then, said 2-nitrobutanol is reduced to 2-amino-1-butanol. Another is a method wherein 2-amino-1-butanol is produced by the reduction of an ester of α-aminobutyric acid with lithium alminium hydride or sodium boron hydride [1097 - 1102, Vol. 84 Monatshefte fuer Chemie und Verwandte Teile Anderer Wissenschaften (1953)].

However, in the former method, the starting material, 1-nitropropane is expensive, besides, adequate minute caution is required when handling 1-nitropropane because of its explosive nature owing to the nitro group.

In the latter method, the reducing agents are industrially considered to be special products and extremely expensive.

Accordingly, the aforementioned conventional methods are industrially disadvantageous.

There is another method for producing 2-aminoalcohols by reducing α-aminoacids with metallic sodium, but it is not advantageous also, because protection of the amino group such as acylation is necessary at the reduction reaction and metallic sodium which is dangerous to handle must be employed.

On the other hand, the copper chromite-catalyzed reaction is well known as a method to prepare alcohols by the reduction of esters of organic acids, for example, higher alcohols are industrially produced from an ester of a fatty acid.

The inventors noticed the merit of this reduction method and investigated the process to produce 2-amino-1-butanol by the reduction of an ester of α-aminobutyric acid in the presence of a copper chromite catalyst.

The copper chromite-catalyzed reaction require a high temperature and a high pressure. In the case of producing higher alcohols, both the starting material, the ester of fatty acid and the product are stable, therefore the reaction may be carried out without any hindrance. However, in case of producing 2-amino alcohols from α-amino acids under the same conditions as the ones in the production of higher alcohols, both of them, namely, α-amino acid and 2-amino alcohol are so weak that side reactions increase and 2-aminoalcohols cannot be obtained in a high yield. That is to say, the desired product may be obtained only in small quantities when the reaction temperature is too high, but a rate of the reaction is extremely slow when the temperature is too low.

In case of producing a higher alcohol, a copper chromite catalyst is placed in a reactor together with a starting material and a solvent, and a hydrogen pressure is applied and the reaction mixture is heated, however 2-amino-1-butanol can only be obtained in small quantities when an ester of α-aminobutyric acid is allowed to react by said method.

OBJECTS OF THE INVENTION

It is an object of the invention to overcome the disadvantages of the aforementioned usual methods and to provide an improved process for producing 2-amino-1-butanol.

Other and further objects, features and advantages of the invention will appear more fully from the following description.

BRIEF SUMMARY OF THE INVENTION

According to the present invention, 2-amino-1-butanol can be obtained in a high yield by the reduction of ester of α-aminobutyric acid in the presence of copper chromite catalyst which has received a preliminary treatment with hydrogen.

DETAILED DESCRIPTION OF THE INVENTION

The ester of α-aminobutyric acid employed in the present invention as a starting material is a lower alkyl ester of the corresponding acid.

The lower alkyl group is preferably the one containing 1 to 4 carbon atoms. The ethyl ester of α-aminobutyric acid is more preferable, taking the preparation of ester and stability of ester and its reactivity at the reduction reaction into consideration.

The copper chromite catalyst employed in the present invention is a compound having the chemical formula of $CuO \cdot CuCr_2O_4$ as a principal constituent, namely, the copper chromite catalyst refers to not only $CuO \cdot CuCr_2O_4$ but also a material containing a small amount of barium, magnesium or the like.

The copper chromite catalyst is used in a form supported on a carrier as well. The copper chromite catalyst is added by an amount of more than 1 wt.%, preferably 3 to 50 wt.% of an amount of a starting material, ester of α-aminobutyric acid. According as the addition amount of copper chromite catalyst increase, it becomes possible that the reaction is carried out at a lower temperature, and side reactions may be inhibited. As a matter of course, the reaction may be carried out in an amount of more than 50 wt.% but such a large amount of more than 50 wt.% is not economical.

Even if the addition amount of copper chromite catalyst is 1 wt.% or less, the reaction may proceed but is slow, so that side reactions tend to increase.

As a solvent of the present invention, the following compounds are used. For example, aliphatic alcohols and glycols having 1 to 10 of carbon atom, such as methanol, ethanol, n-butanol, isodecanol, diethyleneglycol, methylene glycol or the like, and ethers or compounds having a bond of the ether type such as n-butyl ether, dimethoxy ethane, anisol, dioxane or the like, and aromatic compounds such as benzene, cumene or the like. Ethanol is preferable of alcohols and generally, a compound having a bond of ether type such as dioxane, dimethoxyethane or the like is preferably used as solvent. Mixed solvent may be also used.

The solvent is used in an amount of 0.5 to 10 times the amount of the starting material by weight, preferably 1 to 4 times. Accordingly as the amount of solvent increases, side reactions decrease but the reaction time becomes longer and using too much solvent is undesirable from an industrial standpoint. When the amount of solvent is less than 0.5 times the amount of a starting material, side reactions tend to increase.

When carring out the reaction, copper chromite catalyst receives a preliminary treatment, in other words, the copper chromite catalyst and the solvent are placed in a reactor and hydrogen pressure is applied in a range of 10 to 300 kg/cm$^2$, preferably 30 to 270 kg/cm$^2$, more preferably 100 to 250 kg/cm$^2$ and the mixture is heated at a temperature of 50° to 220°C, preferably 80° to 180°C. A hydrogen pressure below 10 kg/cm$^2$ does not produce sufficient effects for the preliminary treatment. A hydrogen pressure above 300 kg/cm$^2$ is also useful but such high pressure is industrially undesirable.

The preliminary treatment of the copper chromite catalyst is accomplished almost instantly but it preferably requires 5 to 60 minutes of heating in order to be sufficiently accomplished. The preliminary treatment can also be carried out at a temperature above 220°C, but such high temperature is unnecessary.

After the preliminary treatment of the copper chromite catalyst, a starting material, i.e., an ester of α-aminobutyric acid is forced into a reactor, or after cooling, an ester of α-aminobutyric acid is added to the reaction mixture, and the mixture is allowed to react under a hydrogen pressure of more than 50 kg/cm$^2$, preferably 100 to 300 kg/cm$^2$, at a temperature of 50° to 200°C, preferably 80° to 180°C during 0.5 to 10 hours, preferably 0.5 to 3 hours. After the reaction is finished, the reaction mixture is cooled and catalyst removed by filtration and solvent removed by distillation and then, 2-amino-1-butanol is obtained by distillation under reduced pressure.

Even if either the hydrogen pressure is 50 kg/cm$^2$ or lower, or the reaction temperature is lower than 50°C, the reaction may be carried out but the reaction is retarded and the yield tend to decrease.

As a matter of course, a hydrogen pressure of more than 300 kg/cm$^2$ also serves the purpose, however it is industrially undesirable.

Also if the reaction temperature is higher than 180°C, the reaction may be carried out but side reactions tend to increase, in other words, dimerization of a starting material or the product to ketopiperazine or piperazine derivative respectively tend to increase. Further, in case of using lower alkyl alcohols as solvent, the reaction temperature being higher than 180°C, N-alkyl derivative of hydroxyamine are apt to be produced.

According to the present invention, 2-amino-1-butanol is produced in a high yield without coloring and irritant odor which are unavoidable in usual process.

The following examples are included merely to aid in the understanding of the invention, and variations may be made by one skilled in the art without departing from the spirit and scope of the invention.

EXAMPLE 1

In a 100 c.c. autoclave there were placed 6g of copper chromite catalyst ($Cu_2Cr_2O_5$, trade name C-3, manufactured from Sakai Kagaku Co.) and 26g of dioxane, and a hydrogen pressure of 140 kg/cm$^2$ is applied and heated. When the temperature came to 120°C, the reaction mixture was cooled. Then, 13g of α-amino-ethylbutyrate was added to the reaction mixture and a hydrogen pressure of 125 kg/cm$^2$ applied and heated. The reaction was carried out at a temperature of 140°C during 1 hour. After cooling, the catalyst was removed by filtration and washed with dioxane. And then the filtrate was distilled under reduced pressure to yield 8.5g of crude product which had a boiling point of 78° to 82°C under a pressure of 15mmHg.

The crude product was analyzed by gas chromatography and it was confirmed that 2-amino-1-butanol was produced in a yield of 98.9%.

EXAMPLE 2

The same reaction as in Example 1 was carried out by using a copper chromite catalyst (trade name C-5, manufactured from Sakai Kagaku Co.) to yield 8.4g of a distillate containing 97.5% of 2-amino-1-butanol. The yield was 98.1%.

EXAMPLE 3

In a 20 liter autoclave were placed 500g of copper chromite catalyst (trade name N-203, manufactured from Nikki Kagaku Co.) and 2.8kg of dioxane and a hydrogen pressure of 130 kg/cm$^2$ applied and heated.

When the temperature came to 120°C, the reaction mixture was cooled and 1.4 kg of α-amino ethylbutyrate was added to it and then a hydrogen pressure of 140 kg/cm$^2$ applied and heated. After the reaction was carried out at a temperature of 140°C during 40 minutes, the reaction mixture was treated as in Example 1 to yield 0.9 kg of distillate containing 96.4% of 2-amino-1-butanol. The yield was 91.2%.

EXAMPLE 4

In a 100 c.c. autoclave were placed 4g of copper chromite catalyst (trade name C-5) and 26g of dioxane and a hydrogen pressure of 130 kg/cm$^2$ applied and heated. When the temperature came to 120°C, the reaction mixture was cooled and 13g of α-amino ethylbutyrate was added to it, and then a hydrogen pressure of 125 kg/cm$^2$ applied and heated. After the reaction had proceeded during 1.5 hours at a temperature of 140°C, the reaction mixture was treated as in Example 1.

The distillate was analyzed by gas chromatography. As the result, it was confirmed that 7.4g of 2-amino-1-butanol was produced. The yield was 83.5%.

EXAMPLE 5

In a 1-liter autoclave were placed 15.2g of copper chromite catalyst (trade name N-203) and 208g of dioxane and a hydrogen pressure of 192 kg/cm$^2$ applied and heated. When the temperature was increased to 150°C, the hydrogen pressure rising to 255 kg/cm$^2$, the reaction mixture was cooled and 100g of α-amino ethylbutyrate was added to it and then a hydrogen pressure of 270 kg/cm$^2$ applied and heated. After the reaction had proceeded during 1.5 hours at a temperature of 150°C, the reaction mixture was treated as in Example 1. As the result of analysis by gas chromatography, it was confirmed that 66.2g of 2-amino-1-butanol was produced in a yield of 97.5%.

EXAMPLE 6

In a 1-liter autoclave were placed 15g of copper chromite catalyst (trade name N-203) and 174g of dimethoxy ethane and a hydrogen pressure of 173 kg/cm$^2$ applied and heated. When the temperature was increased to 150°C, the hydrogen pressure rising to 243 kg/cm², the reaction mixture was cooled and 100g of α-amino ethylbutyrate was added to it and then a hydrogen pressure of 270 kg/cm² applied and heated. After the reaction had proceeded during 40 minutes at a temperature of 170°C, the reaction mixture was treated as in Example 1. As the result of analysis by gas chromatography, it was confirmed that 64.1g of 2-amino-1-butanol was produced in a yield of 94.3%.

EXAMPLE 7

In a 1-liter autoclave were placed 6g of copper chromite catalyst (trade name N-203) and 312g of dioxane and a hydrogen pressure of 199 kg/cm² applied and heated. When the temperature was increased to 160°C, the hydrogen pressure rising to 256 kg/cm², the reaction mixture was cooled and 150g of α-amino ethylbutyrate was added to it and then a hydrogen pressurse of 218 kg/cm² was applied and heated again. After the reaction had proceeded during 1.5 hours at a temperature of 170°C, the reaction mixture was treated as in Example 1.

As the result of analysis by gas chromatography, it was confirmed that 94.5g of 2-amino-1-butanol was produced in a yield of 92.8%.

COMPARISON EXAMPLE 1

In a 100 c.c. autoclave were placed 6g of copper chromite catalyst (trade name C-3), manufactured from Sakai Kagaku Co.), 26g of dioxane and 13g of α-amino ethylbutyrate, and a hydrogen pressure of 125 kg/cm² applied. The temperature was increased to 140°C. After the reaction had proceeded during 1 hour at a temperature of 140°C, the reaction mixture was cooled and treated as in Example 1. However, 2-amino-1-butanol was not obtained.

What is claimed is:

1. A process for the production of 2-amino-1-butanol which comprises reducing an ester of α-aminobutyric acid with hydrogen in an organic solvent in the presence of a copper chromite catalyst containing $CuO \cdot CuCr_2O_4$ as the principal constituent which is subjected to a reduction reaction with hydrogen in advance of said reduction.

2. A process in accordance with claim 1, wherein the reaction of the copper chromite catalyst with hydrogen is conducted at a temperature of 50° to 220°C and under a hydrogen atmosphere at a pressure of 10 to 300 kg/cm².

3. A process in accordance with claim 2 wherein the reaction of the copper chromite catalyst is conducted at a temperature of 80° to 180°C and under a hydrogen atmosphere at a pressure of 30 to 270 kg/cm².

4. A process in accordance with claim 1, wherein the temperature of the reduction reaction is in a range of 50° to 220°C.

5. A process in accordance with claim 4, wherein the temperature of the reduction reaction is in a range of 80° to 180°C.

6. A process in accordance with claim 1, wherein a hydrogen pressure of the reduction reaction is more than 50 kg/cm².

7. A process in accordance with claim 6, wherein the hydrogen pressure of the reduction reaction is in a range of 100 to 300 kg/cm².

8. A process in accordance with claim 1, wherein the amount of copper chromite catalyst is more than 1 wt.% of an amount of ester of α-aminobutyric acid.

9. A process in accordance with claim 8, wherein the amount of copper catalyst is in a range of 3 to 50 wt.% of an amount of ester of α-aminobutyric acid.

* * * * *

UNITED STATES PATENT AND TRADEMARK OFFICE
CERTIFICATE OF CORRECTION

PATENT NO. : 3,906,046
DATED : September 16, 1975
INVENTOR(S) : Hiroshi Yoshida et al.

It is certified that error appears in the above—identified patent and that said Letters Patent is hereby corrected as shown below:

On The Cover Page Assignee, should read

-- Nippon Soda Company Limited, Tokyo, Japan and

Osaka-Fu Prefecture Municipality of Japan --.

Signed and Sealed this

*Eighth* Day of *January 1980*

[SEAL]

*Attest:*

*Attesting Officer*

SIDNEY A. DIAMOND
*Commissioner of Patents and Trademarks*